Feb. 14, 1961  L. D. HAGENBOOK  2,971,234
ROPE SIDE FRAME CONVEYOR CLAMP
Filed March 21, 1958
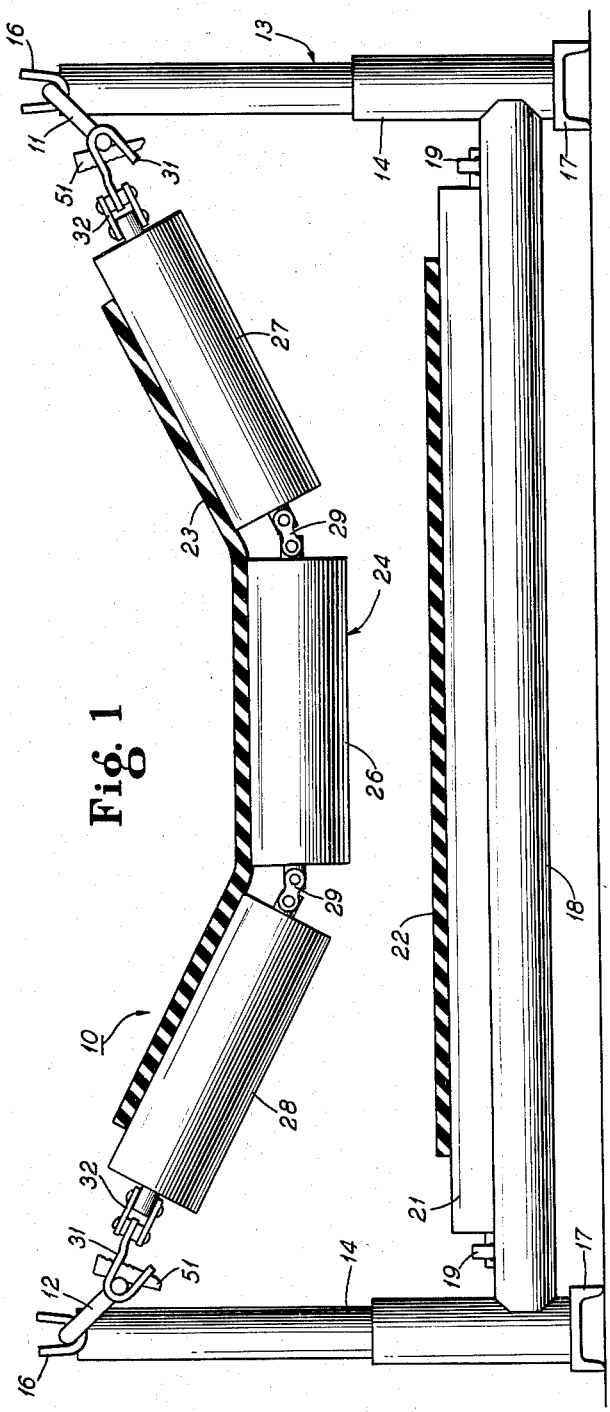
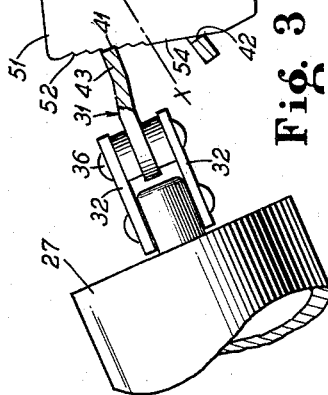
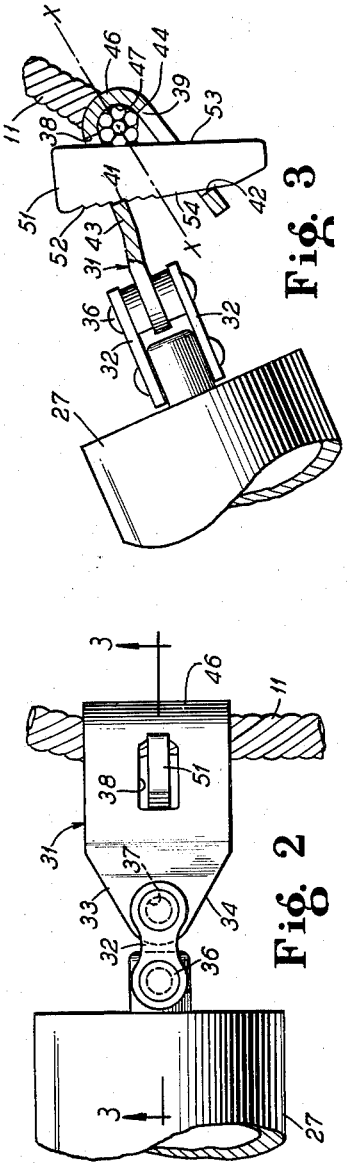
INVENTOR.
Loy D. Hagenbook
BY
Murray A. Gleeson
ATTORNEY

United States Patent Office 2,971,234
Patented Feb. 14, 1961

2,971,234

ROPE SIDE FRAME CONVEYOR CLAMP

Loy D. Hagenbook, Chicago, Ill., assignor to Goodman Manufacturing Company, Chicago, Ill., a corporation of Illinois Filed Mar. 21, 1958, Ser. No. 722,940

1 Claim. (Cl. 24—126)

This invention relates to rope frame conveyors and more particularly to a rope clamp for connecting a roller assembly to a wire rope.

In rope frame conveyors, a pair of ropes is trained along the course over which the conveyor is to operate and is supported above the ground on suitable supports. The idlers supporting the carrying run of the belt and hence the load are in turn supported on these ropes. Much effort has been put forth to develop a satisfactory clamp for securing the roller assemblies to the ropes. It is important that such a clamp grip the rope securely to prevent longitudinal shifting of the roller assemblies with consequent misalignment of the conveyor belt. As a practical consideration, the clamp must also be capable of quick and easy installation or removal.

One of the recognized methods for connecting a roller assembly to a rope has been to provide a U-shape clamp embracing the rope on three sides. The clamp has holes adjacent the rope-engaging surfaces through which is driven a tapered pin to frictionally engage the rope and the clamp thereby "staking" the clamp in position on the rope. One of the difficulties encountered in the use of such devices has been that the tapered pin tends to become loose in the holes, thereby releasing the frictional grip between the clamp and rope and allowing the clamp to slide along the rope.

Accordingly, it is a principal object of the present invention to provide a rope clamp comprising a pair of limbs extending more or less parallel to a plane containing the rope, the limbs being interconnected by a bight embracing the rope, the rope being held in the bight by a tapered, serrated drift pin driven through apertures in the limbs, the specific improvement here being in offsetting the apertures at different spacings relative to the rope to enable the drift pin to be canted relative to said plane with its serrated side interlocked with a corner of one of the apertures to thereby lock the clamp against unintentional loosening or removal relative to the rope.

Other objects and advantages will more fully appear in the following description in which;

Figure 1 is a cross sectional elevation view of a rope frame conveyor;

Figure 2 is a plan view of a rope clamp according to the present invention; and

Figure 3 is an elevation view in section taken along the line 3—3 of Figure 2 looking in the direction of the arrows.

In the drawings, the numeral 10 designates generally a rope frame conveyor having a pair of aligned ropes 11 and 12 supported above the ground on a stand 13. The stand 13 has a pair of upright legs 14, 14, each of which is surmounted by a U-shape clip 16 for engaging the rope 11 or 12. The legs rest upon feet 17 and are spaced apart by cross member 18. The cross member 18 has brackets 19 thereon which support a return roller 21. The return roller supports a return run 22 of a conveyor belt. The carrying run 23 of the belt is supported on an idler assembly 24 consisting of a center roller 26 and wing rollers 27 and 28. The rollers are shown linked together by link 29 to form the assembly 24, the ends of which are connected to a rope clamp 31 by straps 32.

Referring now to Figures 2 and 3, the rope clamp 31 will be described in more detail. One part of the clamp 31 is conveniently made from flat bar stock which is regularly supplied in varying lengths having a uniform width and thickness. The bar is fed into a power press which cuts it into short lengths and punches holes in the pieces thus obtained. Thereafter the pieces are bent, in another power press, into a configuration establishing certain relations between the holes to be more fully explained. This is a procedure highly desirable for its economy since a fairly intricate piece can be produced by two steps, both of which are well known in the manufacturing art.

An end of the piece is trimmed at an angle producing tapered end portions 33 and 34 which provide clearance for a pivotal connecting means here shown as the straps 32 which are secured to the clamp by a pin 36 extending through a hole 37 disposed near the end thereof. A pair of apertures 38 and 39 is punched through the piece providing square shoulders such as 41 and 42. The shoulders around the periphery of the apertures will be square when punched but may become distorted in the subsequent bending operation. The piece is bent into a form having a pair of legs 43 and 44 connected by a bight 46 having a rope engaging inner surface 47. One of the legs 43 may be offset to vary the relation between the connecting means 32 and the rope 11 or rope engaging surface 47. A plane coinciding with the axis of the rope 11 and extending between the legs 43 and 44 is indicated by the broken line X—X. The piece is bent so that the apertures 38 and 39 are offset from each other with respect to this plane. Corresponding shoulders 41 and 42 formed by these apertures are also offset with respect to each other.

An elongated tapered locking pin 51 has a pair of converging generally longitudinally extending opposed surfaces, one of the surfaces 53 is substantially smooth and unobstructed throughout the longitudinal extent thereof and the other surface is provided with a serrated portion 52 adjacent one end portion of the pin 51 and a substantially smooth portion 54 adjacent the other end portion of the pin. When the pin 51 is inserted through the apertures 38 and 39 the smooth surface 53 engages the rope and the serrated portion 52 engages one of the shoulders 41. Further insertion through the apertures brings the smooth portion 54 of the pin 51 into engagement with the other of the shoulders 42. The converging surfaces are effective to wedge the rope 11 tightly against the inner surface 47 of the bight 46 to increase the frictional gripping force and prevent unintentional movement of the clamp along the rope.

The serrations 52 on the pin 51 are interlockingly engaged with the shoulder 41 to prevent the pin 51 from "backing off" and losing the frictional gripping force between the rope 11 and engaging surface 47. The serrations 52 are shown as V-form teeth having a substantial depth, but because of the offset relation of the shoulders 41 and 42 the serrations may be of any convenient size and pitch. The offset relation of the shoulders 41 and 42 causes the pin 51 to be canted with respect to the plane X—X which in turn causes the pin to engage the shoulders at their corners instead of along an inner surface. The serrations, therefore, need only be deep enough to engage the corner; the depth being determined by the frequency of engagement and disengagement and the compressibility of the rope. The novel arrangement of offset shoulders and canted pin achieve a result with serrations and perpendicularly punched apertures otherwise obtainable only at the expense of special tooth forms and oblique shoulders.

While the present invention has been shown and described in terms of a preferred embodiment, it will be understood that various modifications may be made without departing from the spirit and scope of the claim here appended.

I claim:

In a conveyor apparatus including an elongated conveyor component extending between a pair of spaced flexible strand sideframes of a conveyor assembly, and a strand clamp disposed adjacent each end portion of the conveyor component, wherein each said clamp includes a bifurcated hanger having a bight portion and a pair of spaced leg portions extending from the bight portion in divergent relationship to each other and wherein one of said leg portions extends beyond the other leg portion and is provided with connecting means thereon for connecting the clamp to the respective end portion of the conveyor component; the improvement comprising an aperture in each of said leg portions extending generally perpendicularly therethrough to define a substantially square edge having right angle corner portions thereon, with said corner portions being offset and the corner in said one leg portion being nearest to said bight, and an elongated tapered locking pin for engaging the strand positioned within the bight portion of the respective hanger, said locking pin extending obliquely through the respective apertures with the end portions of said locking pin projecting generally outwardly beyond the respective leg portions, said locking pin having opposed generally longitudinally extending surfaces disposed intermediate the end portions thereof, one of said surfaces being substantially smooth and unobstructed throughout the longitudinal extent thereof and disposed in engagement with the respective strand in said bight, the other surface of the locking pin having a plurality of V-shaped teeth adjacent the wider end portion thereof for interlocking engagement with only one of said right angle corner portions of the square edge defined in said one and longer leg portion of the respective hanger for removably retaining said locking pin within the respective apertures, and a substantially smooth portion adjacent the other narrower end portion of said locking pin for oblique engagement with only one corner of the square edge of the shorter leg portion that is adjacent thereto for positioning the locking pin within the respective apertures, the opening in the shorter leg portion being materially larger than the opening in said one and longer leg portion, thereby providing said oblique offset relationship of said square edge portions and permitting said tapered pin to freely enter both said openings to engage said strand in said bight and to be canted thereby in said one leg portion relative to a line midway between the spaced leg portions for positive locking of said wider end portion of said pin on the square edge of the longer leg portion.

References Cited in the file of this patent

UNITED STATES PATENTS

| | | |
|---|---|---|
| 765,256 | Shaw | July 19, 1904 |
| 1,250,003 | Phenicie | Dec. 11, 1917 |
| 1,727,038 | Rousey | Sept. 3, 1929 |
| 2,333,925 | Grossett | Nov. 9, 1943 |
| 2,768,363 | Haynes | Oct. 23, 1956 |
| 2,773,257 | Craggs et al. | Dec. 4, 1956 |
| 2,828,147 | Peiffer | Mar. 25, 1958 |